3,011,891
CATTLE FEED
Pascal Salvator Joseph Locuratolo, Viry-Chatillon, France, assignor to Compagnie de Saint-Gobain, Paris, France
No Drawing. Filed May 21, 1958, Ser. No. 736,691
Claims priority, application France May 23, 1957
2 Claims. (Cl. 99—2)

This invention relates to cattle feed. It is known that it is necessary to complete the rations of nitrogenous and energy-producing fodder of cattle by a mineral suppplement.

This addition of mineral matter must be well balanced and answer qualitatively and quantitatively to the different needs of the animal. The mineral matter can be included in the diet in various forms, as powder, grains, tablets, briquettes, which contain the usual necessary elements (such as calcium, phosphorus, chlorine, sodium, magnesium, sulfur and iron) in substantial quantity as well as traces of elements such as iodine, fluorine, copper, cobalt, manganese, and adequate quantities of vitamins.

It is important that such feeds contain phosphorus and calcium in readily assimilable form, and that the ratio of Ca/P shall be calculated to produce balanced use of those elements by the animal.

The objects of this invention are accomplished, generally speaking, by introducing the phosphorus into the feed at least partially in the form of alkali metal polyphosphate or calcium polyphosphate. Thus, the sodium tripolyphosphate is exemplary of useful compounds.

The alkali polyphosphates and the calcium polyphosphates are perfectly assimilable by the animal organism and are compatible with all other ingredients of a good feed, such as vitamins. They have the special advantage of being agglomerable in a solid body in the form of tablets, briquettes, grains, etc., but sufficiently friable to be readily crushed and absorbed by animals without previous dissolution in water.

The new fodders containing polyphosphates according to my invention have also the important advantage that they render possible the introduction of calcium and phosphorus into the feed in a ratio Ca/P substantially equal to 1 or even less than 1.

The following examples of tablets for cattle illustrate but do not limit the invention:

*Example 1*

| | Parts by weight |
|---|---|
| Anhydrous dicalcium phosphate | 48.0 |
| Sodium chloride | 37.5 |
| Magnesium sulfate | 12.5 |
| Sodium tripolyphosphate | 4.0 |

This formula gives a ratio of Ca to P of 1.

*Example 2*

| | Parts by weight |
|---|---|
| Dicalcium phosphate | 550 |
| Sodium chloride | 245 |
| Magnesium sulfate | 120 |
| Sodium tripolyphosphate | 95 |

This formula gives a ratio of Ca to P of 0.9.

As many apparently widely different embodiments of the present invention may be made without departing from the spirit and scope thereof, it is to be understood that the invention is not limited to the specific embodiments.

What is claimed is:

1. The method of preparing cattle food containing the elements calcium and phosphorus that comprises forming a friable solid body containing sodium tripolyphosphate and dicalcium phosphate, the ratio of Ca to P in the body being about 0.9–1.0.

2. The method which comprises preparing a food product containing the elements calcium and phosphorus that comprises forming a friable solid body containing sodium tripolyphosphate and dicalcium phosphate, the ratio of Ca to P in the body being about 0.9–1.0, and feeding the product to cattle.

References Cited in the file of this patent

UNITED STATES PATENTS

| 2,288,418 | Partridge | June 30, 1942 |
| 2,759,795 | Archer | Aug. 21, 1956 |

FOREIGN PATENTS

| 462,935 | Great Britain | May 18, 1937 |
| 655,114 | Great Britain | July 11, 1951 |